Jan. 21, 1969  D. D. DENGLER  3,422,885

TANK COVER

Filed Jan. 20, 1967

INVENTOR.
DANIEL D. DENGLER
BY
R. H. Hatton
ATTORNEY

United States Patent Office 3,422,885
Patented Jan. 21, 1969

3,422,885
TANK COVER
Daniel D. Dengler, Mogadore, Ohio, assignor to The Goodyear Tire & Rubber Company, Akron, Ohio, a corporation of Ohio
Filed Jan. 20, 1967, Ser. No. 610,690
U.S. Cl. 165—72        5 Claims
Int. Cl. F28d 1/06; F28f 7/00

ABSTRACT OF THE DISCLOSURE

A tank cover comprising a corrosive resistant lining attached to a rigid metallic grill-work which not only allows the rapid dissipation of heat from the lining, but also provides substantial reinforcement for the cover. This grill-work may take the form of substantially parallel intersecting rectangular grids or be simply a perforated plate.

---

The present invention relates to tank covers and more specifically, to covers for tanks of the type used in the descaling of steel.

Presently, covers for tanks containing corrosive material of the type used in the descaling or "pickling" of steel are solid steel plates to which is bonded an elastomeric corrosive resistant lining. One of the disadvantages of this construction is that the bond between the lining and the steel is adversely affected by the heat created in the tank during the descaling process. This results in failure of the bond after a relatively short time thus requiring that the lining be replaced even though the lining itself is in relatively good condition. It is also difficult to detect and repair defects in the solid covers.

In an attempt to eliminate this problem, other materials such as rigid plastic or Fiberglas have been used for the tank covers. However, since it is necessary that the covers support the weight of a man while cleaning or repairing the equipment used in the pickling or descaling operations, these materials have not been practical due to their lack of strength.

Experiments have shown that if a rigid metallic grill-work is used in place of the solid cover, a more rapid dissipation of heat is accomplished with a resulting decrease in the temperature in the bond area between the metal and the lining. In addition, this structure provides substantial reinforcement for the cover with a minimum of weight.

It is therefore an object of the present invention to provide a tank cover which will rapidly dissipate heat from the bond area between the outer metal cover and the inner corrosive resistant lining.

Another object of this invention is to provide a tank cover having substantial reinforcement to support the weight of a man during cleaning and repairing operations.

A further object of this invention is to provide a tank cover in which defects will be more readily detected.

A still further object of this invention is to provide a tank cover in which repairs will be facilitated.

Other objects and advantages of this invention will become apparent hereinafter as the description thereof proceeds, the novel features, arrangements and combinations being clearly pointed out in the specification as well as the claims thereunto appended.

Figure 1:
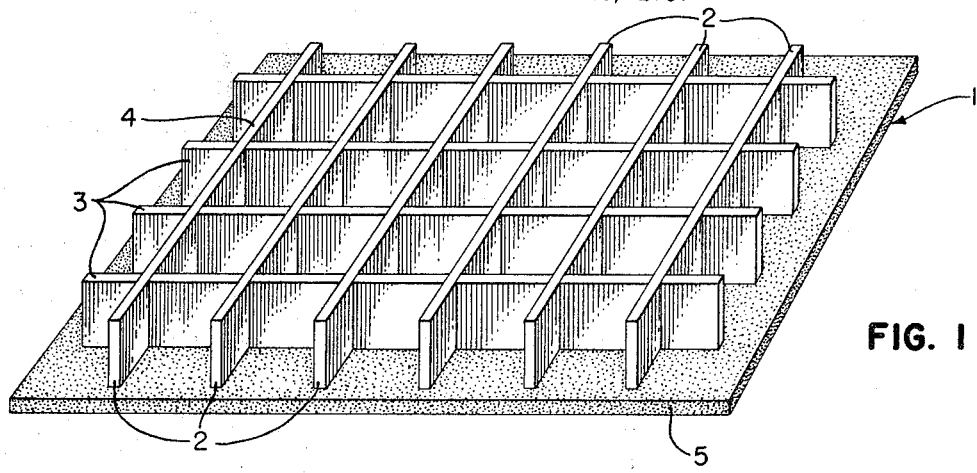
FIG. 1 is a perspective view of one form of the tank cover illustrating this invention.

Referring now to the drawings, FIG. 1 shows a tank cover 1 having a first group of metal strips 2 and a second group of metal strips 3 joined together to form a rigid metallic grill-work 4 which is of conventional grill-work configuration. A corrosive resistant lining 5 preferably of elastomeric material is attached to one side of the grill-work 4 usually by means of an elastomeric adhesive which bonds the lining 5 to the bottom surface of grill-work 4. The cover 1 is then positioned over the top of the opening of the tank, not shown, with the lining 3 down and facing the tank's interior. In this position, the corrosive vapors of the acid contained in the tank contact directly the lining 5 thus subjecting it not only to the corrosive effects of the vapors, but also to the heat of the reaction between the steel and the acid. Sulphuric or hydrochloric acid are usually used in this process, however, the tank may contain other corrosive materials depending upon the type of metal being descaled. The aforementioned arrangement allows grill-work 4 to act as a heat sink to rapidly dissipate heat from the bond area since the surfaces of metal strips 2 and 3 are exposed to the atmosphere. The openings between the strips 2 and 3 also permit defects in the lining 5 to be detected and repaired more rapidly and effectively since a substantial portion of the lining area is available for visual examination. The thickness of strips 2 and 3, along with the structural design of the grill-work 4, provide substantial reinforcement to cover 1.

Figure 2:
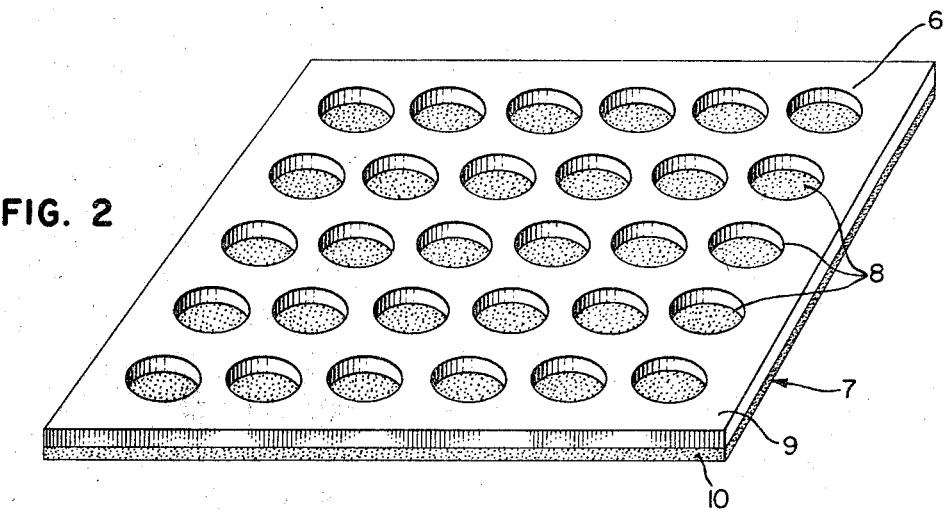
FIG. 2 is a perspective view of a modification of the invention shown in FIG. 1.

In FIG. 2, another embodiment of this invention is ilustrated in which the grill-work 6 of cover 7 is formed by openings 8 in metal plate 9. This arrangement also permits the rapid dissipation of heat from the bond area between the plate 9 and the lining 10.

Figure 3:
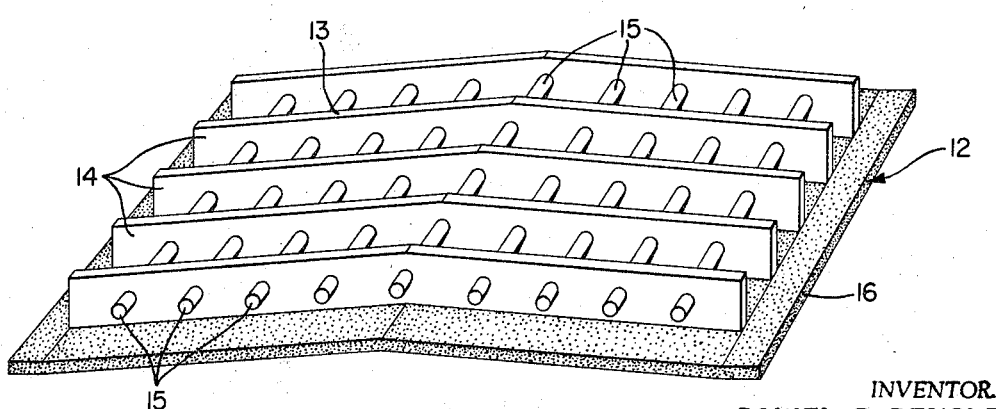
FIG. 3 is a perspective view of another modification of the invention shown in FIG. 1.

The preferred embodiment of the invention is shown in FIG. 3 in which the metallic grill-work 13 takes the form of a series of uniformly spaced substantially parallel rectangular steel strips 14 extending generally the length of the cover 12. The strips 14 are supported by a series of substantially parallel cylindrical steel bars 15 extending through the strips 14 and are substantially perpendicular thereto extending as shown, generally across the width of the cover 12. The heat is then dissipated from the bond area between the grill-work 13 and the lining 16 as previously described. The strips 14 are preferably formed in an inverted V-shape to allow the fluids used during cleaning to drain from the cover 12.

While certain representative embodiments and details have been shown for the purpose of illustrating the invention, it will be apparent to those skilled in the art that various changes and modifications may be made therein without departing from the spirit or scope of the invention.

I claim:

1. A cover for a tank containing corrosive material of the type used in the descaling of steel comprising a rigid metallic grill-work including at least one group of strips having a substantially rectangular cross-sectional configuration with the length thereof being normal to the surface of the cover, said grill-work being substantially coextensive with at least a portion of the tank opening and forming a substantially rigid supporting structure, and a corrosion resistant elastomeric lining attached to the bottom surface thereof coming in contact with the corrosive atmosphere of the tank, said grill-work rapidly dissipating heat to which the lining is subjected.

2. A cover as claimed in claim 1 wherein the grill-work is in the form of grid-work comprising a first group of strips having a substantially rectangular cross-sectional configuration extending in one direction, and a second group of strips having a substantially rectangular cross-sectional configuration intersecting said first group of strips and lying generally perpendicular thereto with the length of the cross-sections extending normal to the cover surface.

3. A cover as claimed in claim 1 wherein the grillwork is formed by a first group of spaced substantially rectangular steel strips and a second group of spaced steel supporting bars intersecting said first group of strips and lying generally perpendicular thereto and of a length substantially that of the cover width.

4. A cover as claimed in claim 3 wherein the first group of strips has an inverted V-shaped configuration to allow the fluids used during cleaning to drain from the cover.

5. A cover as claimed in claim 3 wherein the second group of bars has a substantially circular cross-sectional configuration.

References Cited

UNITED STATES PATENTS

| 2,167,344 | 7/1939 | Corr | 165—134 |
| 3,001,766 | 9/1961 | Laist | 165—134 |

ROBERT A. O'LEARY, *Primary Examiner.*

CHARLES SUKALO, *Assistant Examiner.*

U.S. Cl. X.R.

165—186